(12) United States Patent
Bellwood et al.

(10) Patent No.: US 6,584,567 B1
(45) Date of Patent: Jun. 24, 2003

(54) DYNAMIC CONNECTION TO MULTIPLE ORIGIN SERVERS IN A TRANSCODING PROXY

(75) Inventors: Thomas Alexander Bellwood, Austin, TX (US); Christian Lita, Austin, TX (US); Matthew Francis Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,454

(22) Filed: Jun. 30, 1999

(51) Int. Cl.[7] ................................................ G06F 11/30
(52) U.S. Cl. ...................... 713/171; 713/182; 713/200; 713/201
(58) Field of Search ................................. 713/171, 182, 713/200, 201

(56) References Cited

U.S. PATENT DOCUMENTS

| | | | |
|---|---|---|---|
| 5,623,601 A | * 4/1997 | Vu | 713/201 |
| 5,706,434 A | 1/1998 | Kremen et al. | |
| 5,764,750 A | * 6/1998 | Chau et al. | 379/229 |
| 5,781,550 A | * 7/1998 | Templin et al. | 370/401 |

FOREIGN PATENT DOCUMENTS

| | | |
|---|---|---|
| WO | WO 98/43177 | 10/1998 |
| WO | WO 01/03398 A3 | 1/2001 |

OTHER PUBLICATIONS

Norifusa, "Internet security: difficulties and solutions", *International Journal of Medical Informatics*, v. 49, n. 1, pp. 69–74, Mar. 1998.

Han et al., "Dynamic Adaptation in an Image Transcoding Proxy for Mobile Web Browsing", *IEEE Personal Communications*, v. 5, n. 6, pp. 8–17, Dec. 1998.

Fox et al., "Adapting to Network and Client Variability via On–Demand Dynamic Distillation", *7th Intl. Conf. on Architectural Support for Programming Languages and Operating Systems*, pp. 160–170, Oct. 1996.

* cited by examiner

*Primary Examiner*—Thomas R. Peeso
(74) *Attorney, Agent, or Firm*—Jeffrey S. LaBaw; Joseph R. Burwell; David H. Judson

(57) ABSTRACT

A method of enabling a proxy to participate in a secure communication between a client and a set of servers. The method begins by establishing a first secure session between the client and the proxy. Upon verifying the first secure session, the method continues by establishing a second secure session between the client and the proxy. In the second secure session, the client requests the proxy to act as a conduit to a first server. Thereafter, the client and the first server negotiate a first session master secret. Using the first secure session, this first session master secret is then provided by the client to the proxy to enable the proxy to participate in secure communications between the client and the first server. After receiving the first session master secret, the proxy generates cryptographic information that enables it to provide a given service (e.g., transcoding) on the client's behalf and without the first server's knowledge or participation. If data from a second server is required during the processing of a given client request to the first server, the proxy issues a request to the client to tunnel back through the proxy to the second server using the same protocol.

28 Claims, 5 Drawing Sheets

DYNAMIC CONNECTION TO MULTIPLE ORIGIN SERVERS IN A TRANSCODING PROXY

BACKGROUND OF THE INVENTION

1. Technical Field

The present invention relates generally to network security protocols and, in particular, to a method of extending to an intermediary (e.g., a transcoding proxy) the privacy of a secure session between a client and one or more origin servers.

2. Description of the Related Art

Network security protocols, such as Netscape's Secure Sockets Layer protocol (SSL) and the Internet Engineering Task Force (IETF) Transport Layer Security protocol (TLS), provide privacy and data integrity between communicating applications. These protocols, for example, are commonly used to secure electronic commerce transactions over the Internet.

Recently, the computer industry has sought to add computer processing and communications capabilities to devices other than what would normally be considered a traditional computer. Such devices are quite varied and include, for example, personal digital assistants (PDAs), business organizers (e.g., IBM® WorkPad® and the 3Com® PalmPilot®,), smartphones, cellular phones, other handheld devices, and the like. For convenience, these devices, as a class, are sometimes referred to as "pervasive computing" clients as they are devices that are designed to be connected to servers in a computer network and used for computing purposes regardless of their location.

Pervasive computing clients, however, typically do not support the full function set of an HTML Windows-based client. As a result, transcoding services typically are required to translate information to be rendered on the pervasive client from one source markup language (e.g., HTML) to another (e.g., HDML or handheld device markup language). The provision of transcoding services over a secure network connection, however, is problematic. In particular, there is a fundamental conflict between the security and transcoding services because traditional security protocols such as SSL and TLS are designed precisely to prevent a third party from intervening in the communication between the client and the server.

Restricting third party intervention in a secure session is also problematic in other applications. For example, if a client is located behind a firewall, SSL/TLS communications to servers in the outside network cannot be readily audited or otherwise monitored. Thus, data records or other sensitive information can be transmitted from the client, possibly without administrative authorization. As another example, a client that communicates with a server over a secure connection cannot take advantage of third party caching or pre-fetch mechanisms that would otherwise be useful in reducing network resource demands and enhancing communications between the devices.

It would be desirable to provide a mechanism by which a client could delegate enough security information to a proxy to enable the proxy to perform a given function (e.g., transcoding, auditing, monitoring, caching, pre-fetching, encryption/decryption on behalf of the client, etc.) without diluting the security of the network protocol. Further, it would also be desirable to enable such a proxy to secure data from another origin server during the process of servicing a request on behalf of the client.

The present invention solves these important problems.

BRIEF SUMMARY OF THE INVENTION

A client that is using a network security protocol (e.g., SSL or TLS) to communicate with an origin server allows a proxy to participate in the session without changing the security attributes of the session. In accordance with the invention, a protocol is provided to enable the client to take a session master secret negotiated with an origin server, and to securely deliver that secret to the proxy. The proxy uses that master secret to encrypt/decrypt data passing between the client and the server. If the proxy requires additional secure data from a second origin server while servicing a given client request, the proxy asks the client to repeat the protocol to obtain another session master secret (negotiated with the second origin server), which secret is then delivered to the proxy for use in obtaining data from the second origin server.

It is thus an object of the present invention to enable a given third party intermediary or proxy to participate in a secure session between a client and one or more origin servers. Preferably, the third party participates without the express knowledge of a given origin server. As a consequence, the method does not require changes to the origin server or changes to the handshake protocol used in negotiating the session secret.

It is another object of the invention to enable security and other services (e.g., transcoding, caching, monitoring, encryption/decryption on the client's behalf, and the like) to coexist while communications are passed according to a network security protocol.

It is a more specific object of the invention to enable a proxy to provide transcoding services while a pervasive computing client communicates with one or more origin servers over a secure link.

Yet another specific object of the invention is to enable a proxy to perform caching or other administrative services on behalf of a client that communicates with one or more servers using a network security protocol.

A still further object is to enable a proxy to perform encryption/decryption on behalf of a client that communicates with one or more origin servers using a network server protocol.

In a preferred embodiment, a proxy participates in a secure communication between a client and a first server. The method begins by establishing a first secure session between the client and the proxy. Upon verifying the first secure session, the method continues by establishing a second secure session between the client and the proxy. In the second secure session, the client requests the proxy to act as a conduit to the first server. Thereafter, the client and the first server negotiate a first session master secret. Using the first secure session, this first session master secret is then provided by the client to the proxy to enable the proxy to participate in secure communications between the client and the first server. After receiving the first session master secret, the proxy generates cryptographic information that enables it to provide a given service (e.g., transcoding, monitoring, encryption/decryption, caching, or the like) on the client's behalf and without the server's knowledge or participation. The first secure session is maintained between the client and the proxy during such communications.

According to a feature of the present invention, if the proxy requires data from a second server to process a given client request, the above-mentioned protocol is repeated. In particular, the proxy issues a request to the client to establish a separate connection with the second server by again tunneling through the proxy. As described above, this protocol enables the client to establish a second session master secret with the second server, and that secret is shared with the proxy in the manner previously described. The proxy then continues its service operation (e.g., transcoding) by using this second secret to obtain secure data from the second server.

Thus, once the basic tunneling protocol is established between the client and a given origin server, the protocol is repeated as needed by the client to enable the proxy to obtain secure data from up to "n" additional origin servers while servicing a given client request to the given origin server.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
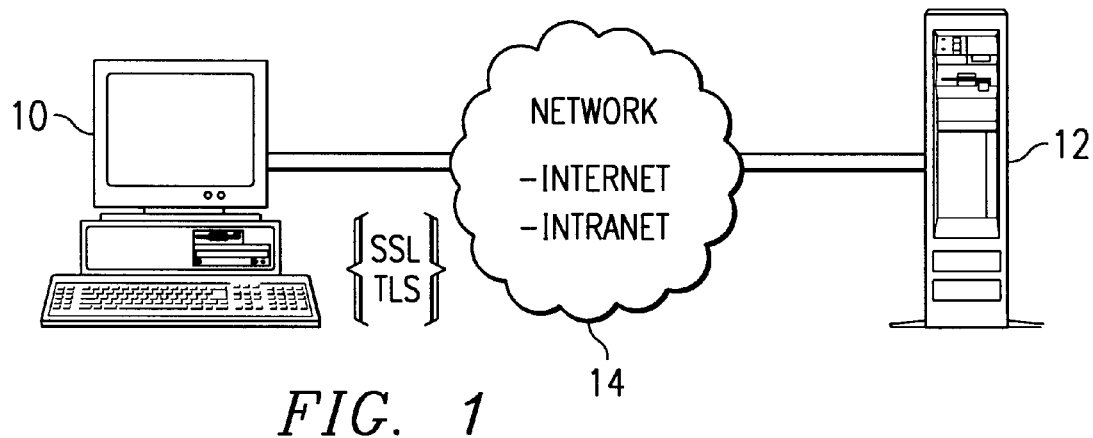
FIG. 1 is a simplified diagram of a known client-server networking environment using a network security protocol.

FIG. 1 illustrates a conventional client-server network architecture of the prior art. In this illustration, client 10 communicates to server 12 over a network 14, which may be the Internet, an intranet, a wide area network, a local area network, or the like. Client 10 and server 12 communicate using a network security protocol, such as Netscape's Secure Socket Layer (SSL) protocol or the IETF's Transport Layer Security (TLS) protocol. Generalizing, a client is any application entity that initiates a TLS or SSL connection to a server. A server is any application entity or program that accepts connections to service requests by sending back responses. Any given program may be capable of being both a client and a server. The primary operational difference between the server and the client is that the server is generally authenticated, while the client is only optionally authenticated. The server on which a given resource resides or is to be created is sometimes referred to herein as an origin server.

The client 10 and the server 12 participate in a secure session. A SSL or TLS session is an association between a client and a server that is created by a handshake protocol. Sessions define a set of cryptographic security parameters, which can be shared among multiple connections. They are used to avoid the expensive negotiation of new security parameters for each connection. In SSL or TLS, a session identifier is a value generated by a server that identifies a particular session. To establish an SSL or TLS session, the client and server perform a handshake, which is an initial negotiation that establishes the parameters of a transaction between the entities. Once a session is created, communications between the client and server occur over a connection, which is a transport (in the OSI layering model definition) that provides a suitable type of service. For SSL and TLS, such connections are peer-to-peer relationships. The connection is transient, and every connection is associated with one session. Typically, communications over the connection are secured using public key cryptography, which is a class of cryptographic techniques employing two-key ciphers. Messages encrypted with a public key can only be decrypted with an associated private key. Conversely, messages signed with the private key can be verified with the public key.

Once the session is established, the client has a certificate, which was issued by the origin server, for the purpose of authenticating the client to the origin server. The client also requires the origin server to present a certificate so that it may authenticate the origin server as valid. Authentication is the ability of one entity to determine the identify of another entity. Typically, as part of the X.509 protocol (a/k/a the ISO Authentication framework), certificates are assigned by a trusted certificate authority and provide a strong binding between a party's identity (or some other attribute) and its public key.

The above-described functionality is known in the art. The functionality is implemented, for example, in protocols conforming to IETF TLS Version 1.0 and SSL Version 2.0/3.0. These protocols, while very similar, are composed of two layers: the record protocol and the handshake protocol. As will be seen, the present invention takes advantage of a method of extending these types of security protocols to extend the privacy of a session to a third party intermediary or proxy. Preferably, the invention is implemented together with a handshake protocol between a client and a proxy that is layered on top of a secure session, as will be seen. This extension does not change the basic properties of the secure connection at the record protocol layer. Although the technique is described in the context of TLS and SSL, this is not a limitation of the present invention.

Figure 2:
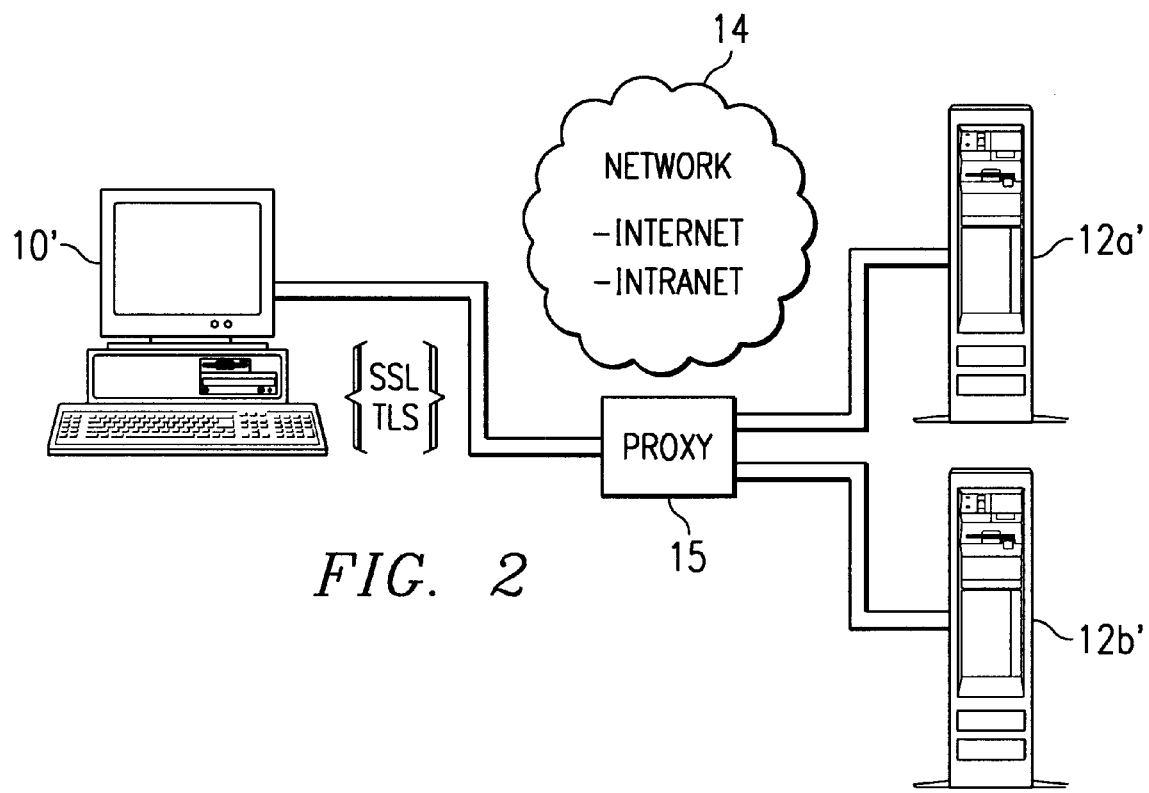
FIG. 2 is a simplified diagram of a client-server networking environment wherein a third party intermediary or proxy participates in a secure session.

Referring now to FIG. 2, the basic method enables a client 10', which is using SSL or TLS as a security protocol to communicate with one or more origin servers 12'$a$–$n$, to allow a proxy 15 to participate in the session without changing the security attributes of the session. As noted above, this method is independent of the encryption strength or the steps used by the client 10' and a given origin server 12' to authenticate each other. The present invention has the same advantages of TLS/SSL in that it extends the protocol yet still allows higher level protocols to be layered on top. Such higher level protocols include, for example, application protocols (e.g., HTTP, TELNET, FTP and SMTP) that normally layer directly on top of the transport (e.g., TCP/IP) layer.

Figure 3A:
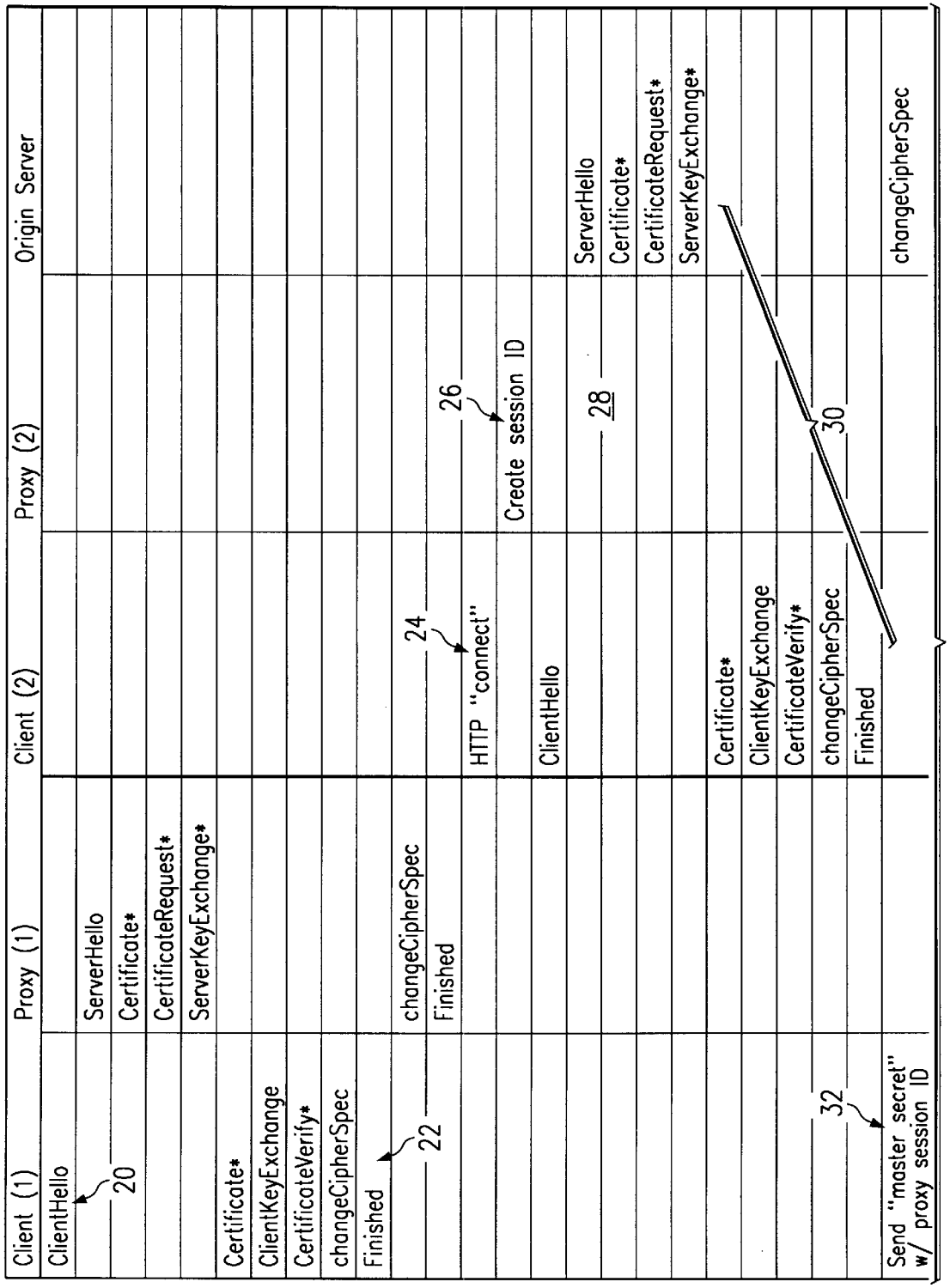
FIG. 3 is a detailed flowchart of the basic tunneling method.
Figure 3B:
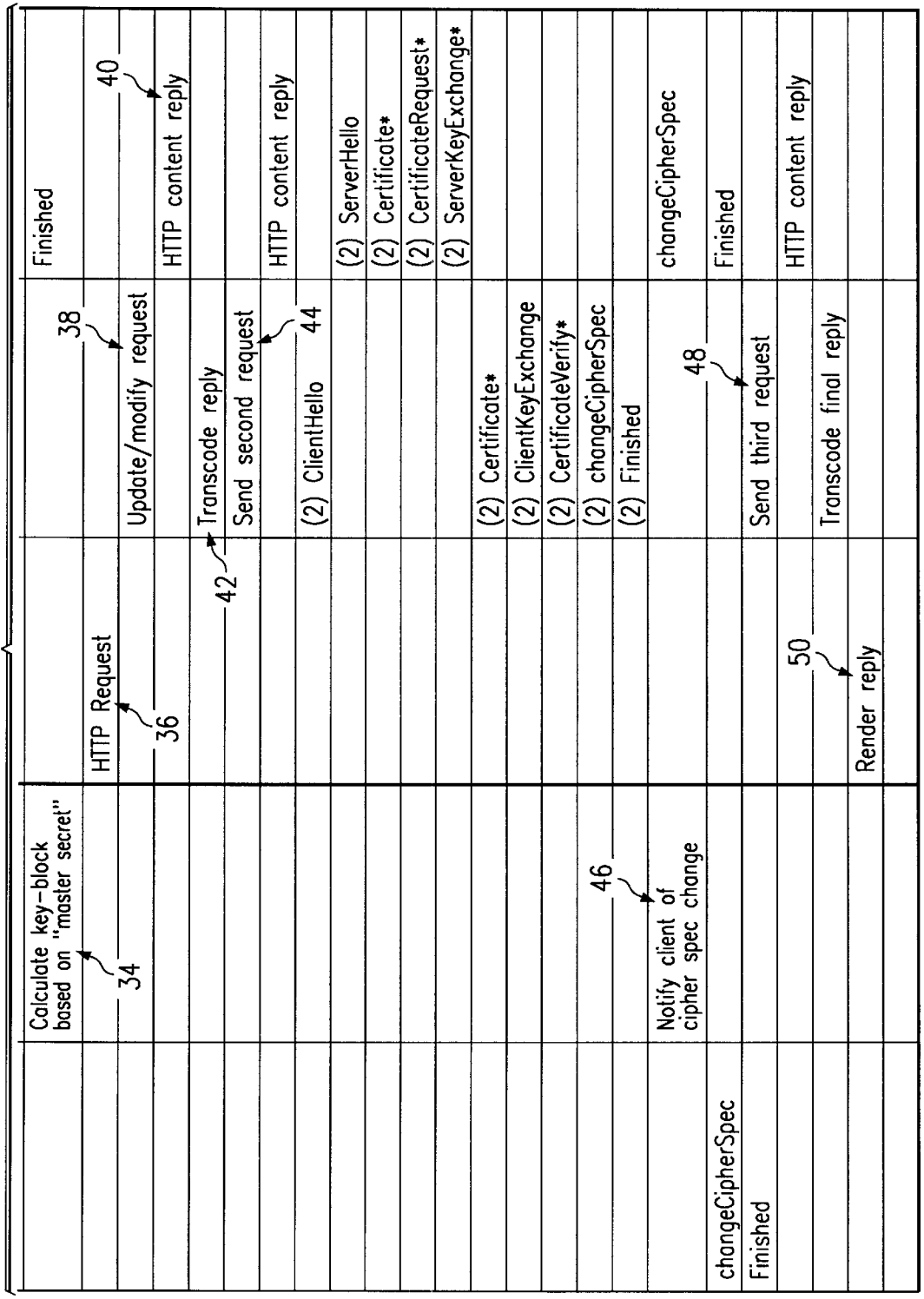

FIG. 3 is a flowchart illustrating the operation of a security delegation protocol useful in the present invention. According to this protocol, the client 10' sets up two (2)

distinct sessions each time it desires to establish a connection with a given origin server. A first secure session is set up between the client 10' and the proxy 15, and this session is used as a pipe or conduit for passing secret information between the client and the proxy. The first secure session is represented by the first two columns of the flowchart. In addition, the client 10 also sets up a second secure session with the proxy, as represented by the last three columns of the flowchart, however, in this session the proxy 15 is used to tunnel to the origin server 12'. A tunnel is an intermediary program that acts as a blind relay between two connections. Once active, a tunnel is not considered a party to a given communication (e.g., an HTTP request or response), although the tunnel may have been initiated by that communication.

In this illustrative example, it is assumed that the client wishes to access an origin server (sometimes referred to as a first server) to retrieve given content but desires to use the proxy to display those contents properly. Servicing of the request may also require retrieval of given objects from one or more additional origin servers. As noted above, according to the SSL/TLS protocol, the client has a certificate issued by an origin server for the purpose of authenticating the client to the origin server, and the client also requires the origin server to present a certificate so that it may authenticate the origin server as valid. As will be seen, the client also requires the proxy to have a certificate to be authenticated by the client prior to it (the client) divulging (to the proxy) a session master secret.

The routine begins at step 20 with the client requesting a secure session with the proxy. This is the first secure session identified above. As seen in the flowchart, the client must request a certificate from the proxy since it is about to delegate its security attributes. This is the primary session through which the client will send (to the proxy) any origin server's negotiated secret, along with an internal session identifier. Typically, this identifier is not the same as the SSL/TLS session identifier. It will be described in more detail in a later step.

At step 22, the client authenticates the validity of the certificate received from the proxy and, as a result, is satisfied that it has a secure session with the proxy. The routine then continues at step 24, with the client opening a second connection to the proxy. This is the second secure session described above. As noted, the client requests to tunnel to a given origin server (e.g., using the HTTP CONNECT method for a request). As part of the tunnel request through the proxy, the client adds a header to the HTTP request notifying the proxy that an internal session identifier should be generated. This header implies that the client intends to forward the master secret to the proxy at a future time.

At step 26, the proxy generates a unique internal session identifier and returns this information to the client. The value of the internal session identifier is attached to the secure HTTP reply. This is the value that the client will use when forwarding the session master secret to the proxy. At step 28, the proxy establishes a connection with the origin server and allows data to flow between the client and the origin server. At this point, the proxy behaves like a tunnel. It does not become an "active proxy" until the client forwards the session master secret, as will be seen. At step 30, the client performs a handshake with the origin server to negotiate a session master secret.

The routine then continues at step 32. At this point, the client sends (to the proxy) the internal session identifier along with the session master secret. This information is sent on the primary session as illustrated. At step 34, the proxy receives the internal session identifier and the session master secret. It uses this information to manufacture the necessary cryptographic information to be used to decrypt origin server replies, to modify the served content, and/or to encrypt data prior to sending it to the client. The proxy then switches to an "active proxy" for the current connection with the origin server.

At step 36, the client sends a secure HTTP request for a resource on the origin server. Optionally, at step 38, the proxy may decrypt the request, and modify it as needed, and then encrypt the new request and send it to the origin server. At step 40, the origin server satisfies the request and sends reply data back to the proxy. Note that the origin server preferably is not even aware of the proxy's active participation. At step 42, the proxy receives the content, decrypts, and modifies the data to satisfy the transcoding needs of the client. Optionally, at step 44, the proxy may establish additional connections with the origin server (if the origin server supports session resumption) for the purpose of obtaining additional data and/or to improve performance. If multiple connections are established, cipher block chaining (CBC) is used to adjust the cipher. If the proxy does not establish an additional connection as part of this session, it must notify the client of the cipher specification changes by sending notification on the primary session along with the session identifier. This process is illustrated at step 46 and is necessary to allow the client to resume this session with the origin server at a future time.

According to the present invention, the proxy may require additional secure sessions to other origin servers during the processing of a given client request to the initial origin server. Thus, for example, if the proxy requires additional secure sessions to other origin servers, e.g., to transcode the current request, it sends a notification to the client requesting the client to establish a new session with each additional origin server required. This is illustrated generally at step 48. Finally, the proxy encrypts the final transcoded content and sends it to the client. This is step 50.

Figure 4:
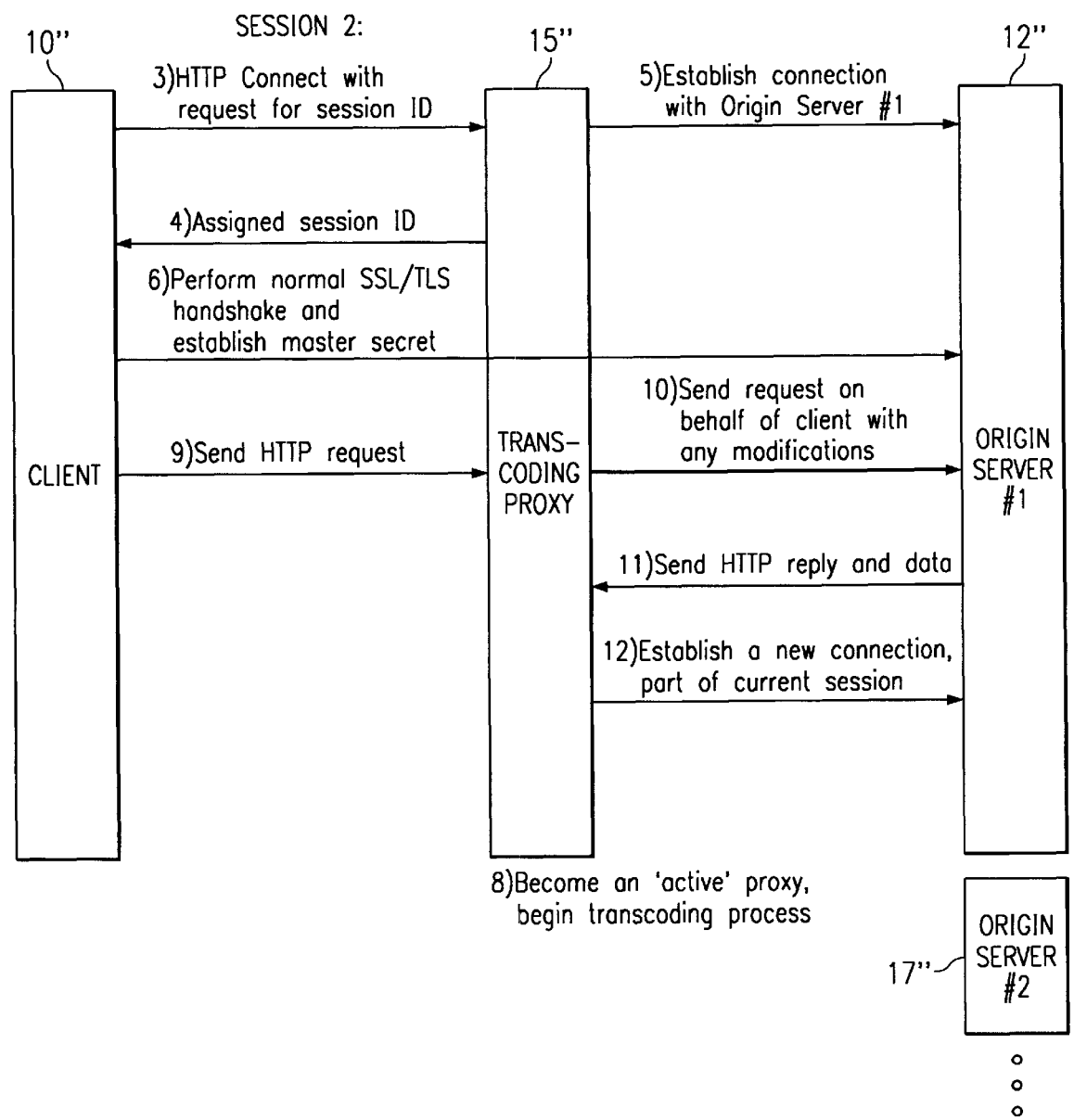
FIG. 4 is a simplified block diagram of the present invention wherein, after the client initially delegates security to the proxy, the proxy requests the client to establish one or more additional secure connections by tunneling through the proxy to "n" additional origin servers.

FIG. 4 illustrates in more detail how the proxy initiates one or more additional secure sessions to other origin servers. In this example, client 10" cooperates with the transcoding proxy 15" and the first origin server 12" in the manner previously described. As illustrated in the figure, Session 1 represents the initial session that the client establishes with the proxy, and Session 2 is where the client establishes the secure session with the first origin server. Steps (1)–(12) illustrated in the figure correspond to the steps described above in the flowchart of FIG. 3. If during the illustrative transcoding operation the proxy 15" determines that it requires secure data from a second origin server 17", the proxy asks the client 10" to establish a second connection with the server 17", in particular, by again tunneling through the proxy. This enables the client to establish a master secret with the second server 17". The latter master secret is sometimes referred to as a second master secret, to distinguish it from the session master secret generated as a result of the client tunneling through the proxy to the first origin server. In particular, step (13) in FIG. 4 illustrates the proxy 15" making the request to the client 10". Steps (3)–(7) are then repeated with the second origin server 17" in the manner previously described.

The proxy 15" has the capability to maintain separate master secrets as required to secure communications between the client, on the one hand, and the respective origin servers, on the other. Thus, the client and the proxy maintain separate master secrets, one for each origin server session, within the context of the original client request. This allows the proxy to access and use data on the client's behalf with multiple origin servers. If desired, the client may deliver the session master secret(s) to the proxy over the same secure session (e.g., Session 1 as illustrated in FIG. 1), or by using different secure sessions.

As can be seen, the client, a given origin server, and the proxy all share a master session secret. In particular, once the client and the given origin server agree on a master session secret, that secret is provided to the proxy through a secure session previously created between the client and the proxy. Stated another way, the client hands off (to the proxy) this master session key after establishing the primary (i.e. first) session (between the client and the proxy). The origin server, however, need not be aware (and typically is not aware) that the proxy is doing some work or otherwise participating in the secure connection.

As can be seen, the changes necessary to support this security delegation are minimal and impact only the client and proxy, not the given origin server or servers that may be needed to process a given client request. Also, this method does not require the client to divulge any information related to its private key or the method used to authenticate the client to the origin server. Further, because the client has the ability to establish additional connections to an origin server, it may change the cipher specification or terminate the session, thus limiting the proxy's capability to establish other connections to the origin server on behalf of the client.

To summarize the changes required, the client needs to have the ability to take one or more session master secrets negotiated with one or more respective origin servers, and to securely deliver them to the proxy. The proxy needs to be able to manufacture the necessary encryption information from the client's master secret(s) to allow it to start participating in the client's session. The above method does not require any changes to the handshake protocol used in negotiating the session secret. The additional load on the overall network traffic is minimal as there is just one additional session between the client and proxy while the client requires services from the proxy. There are no changes required to the origin server(s).

The primary session between the client and the proxy can be considered asynchronous, because for each arriving record there is a session identifier. Writes from the client to the proxy may occur independent of the proxy writing to the client, because there are no acknowledgments required. It is assumed, of course, that the underlying transport layer implements a reliable delivery method. Proxy requests to the client to establish new connections (to additional origin servers) preferably use a null* session identifier, because one will be assigned later by the proxy when the client requests to tunnel. For performance reasons, the proxy does not have to notify the client of cipher specification changes, with the understanding that the client will be forced to perform the full authentication handshake, because it will not be in synchronization with the given origin server. This implies a larger payload on client during initial session establishment with an origin server but reduces the chatter if the proxy establishes new connections or sends additional requests to the given origin server or some other origin server.

There are numerous applications for the proxy. The following are several representative examples.

One such use of the proxy is to reduce the necessary computing power required for a client to perform encryption/decryption. If, for example, the client is located behind a firewall, using the proxy, the client may perform the authentication steps just once but then actually send and receive data in the clear between it and the proxy, thus moving the encryption payload to the proxy. Alternatively, the proxy is used to provide auditing capabilities to a firewall configuration by enabling (or requiring) the client to hand-off the session secret before any actual data records can be exchanged with the origin server. In this case, the proxy need not require the client to deliver any private/privileged information about itself or the origin server. In still another example, the proxy may be used to improve client performance by allowing a caching proxy to participate in the session without changing the security properties of the session between the client and origin server. Alternatively, the proxy may be used to pre-fetch content on behalf of the client (by resuming sessions at a later time) without the proxy having explicit knowledge of the client's private key. In this case, the proxy could obtain, for example, regular updates of the client's subscriptions during off-peak hours. These examples are merely illustrative and should not be taken to limit the scope of this invention.

Thus, as noted above, another application of the present invention is to enable a third party to participate in a secure session involving a pervasive computing client device. Representative devices include a pervasive client that is x86-, PowerPC®- or RISC-based, that includes a realtime operating system such as WindRiver VXWorks™, QSSL QNXNeutrino™, or Microsoft Windows CE, and that may include a Web browser. This application is now illustrated in more detail below.

Figure 5:
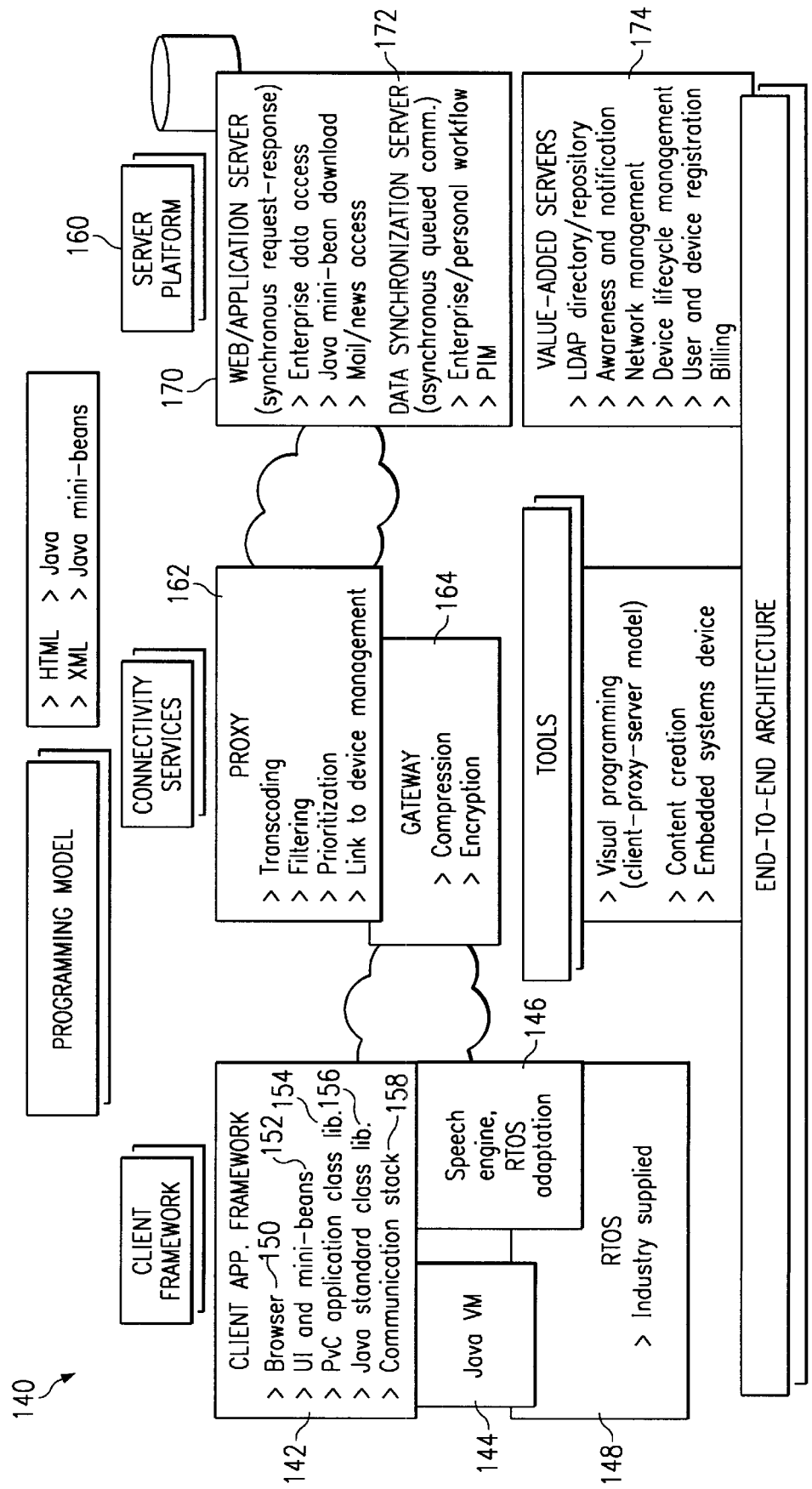
FIG. 5 is a block diagram of a pervasive computing client-server architecture in which the present invention may be implemented.

Referring now to FIG. 5, a representative pervasive computing device comprises client stack 140 including a number of components, for example, a client application framework 142, a virtual machine 144, a speech engine 146, and an industry-supplied runtime operating system (RTOS) 148. The client application framework 142 typically includes a browser 150, a user interface 152, a pervasive computing client application class library 154, a standard Java class library 156, and a communication stack 158. The pervasive computing client connects to a server platform 160 via a connectivity service 162.

At its lower level, the connectivity service 62 includes a gateway 164 that provides compression and encryption functions. The gateway implements a network security protocol that has been extended according to the method of the present invention. The upper level of the connectivity service 162 is the proxy 166 that provides one or more different functions such as: transcoding, filtering, prioritization and link to device management.

The server platform 160, namely, a given origin server, may be of several different types. The platform 160 may be a Web/application server 170 (a synchronous request-response type server) or a data synchronization server 172 174 (an asynchronous queued communication type server). The basic functions of each such server type are illustrated. Alternatively, the platform 160 may be a value-added server that provides additional services such as LDAP directory/ repository, awareness and notification, network management, device life cycle management, user and device registration, or billing.

The security delegation protocol provides numerous advantages over the prior art. As discussed above, the protocol extension does not change the basic properties of a secure connection at the record protocol layer. Moreover, the connection to the proxy is private, and symmetric cryptography (e.g., DES, RC4, etc.) may be used for data encryption. The keys for this symmetric encryption preferably are generated uniquely for each connection and are based on a secret negotiated by another protocol (such as TLS or SSL handshake protocol). Further, the connection to the proxy is reliable. Message transport typically includes a message integrity check using a keyed MAC. Preferably, secure hash functions (e.g., SHA, MD5, etc.) are used for MAC computations.

The handshake protocol provides connection security with several basic properties. The peer's identity can be authenticated using asymmetric, i.e. public key, cryptography (e.g., RSA, DSS, etc.). This authentication can be made optional, but is generally required for at least one of the peers. Moreover, the negotiation of a shared secret is secure. The negotiated secret is unavailable to eavesdroppers, and for any authenticated connection the secret cannot be obtained, even by an attacker who can place himself in the middle of the connection. Further, the negotiation with the proxy is reliable. No attacker can modify the negotiated communication without being detected by the parties to the communication.

As further discussed above, the security protocol allows a proxy to participate in a secure session between a client and a set of origin servers without changing the attributes of the session. The method is also independent of the encryption strength or the authentication techniques used.

The invention may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by letters patent is set forth in the following claims.

We claim:

1. A method of enabling a proxy to participate in a secure communication between a client and a first origin server, comprising the step of:

(a) establishing a first secure session between the client and the proxy;

(b) upon verifying the first secure session, establishing a second secure session between the client and the proxy, the second secure session requesting the proxy to act as a conduit to the first origin server;

(c) having the client and the first origin server negotiate a session master secret;

(d) having the client deliver the session master secret to the proxy using the first secure session to enable the proxy to participate in the secure communication;

(e) responsive to a client request to the first origin server, repeating steps (a)–(b) to enable the proxy to act as a conduit to a second origin server;

(f) having the client and the second origin server negotiate a new session master secret; and (g) having the client deliver the new session master secret to the proxy using the first secure session generated in step (e).

2. The method as described in claim 1 further including the step of having the proxy use the session master secret and the new session master secret to generate given cryptographic information.

3. The method as described in claim 2 further including the step of having the proxy enter an active operating state following receipt of the session master secret in step (d).

4. The method as described in claim 3 wherein the proxy performs a given service on behalf of the client in the active operating state.

5. The method as described in claim 4 wherein the given service is transcoding.

6. The method as described in claim 1 wherein the first and second secure sessions conform to a network security protocol.

7. The method as described in claim 6 wherein the network security protocol is SSL.

8. The method as described in claim 6 wherein the network security protocol is TLS.

9. The method as described in claim 1 wherein the server is a Web server and the client is a pervasive computing client.

10. A method of enabling a proxy to participate in a secure communication between a client and a server, comprising the step of:

(a) for each of a set of 1 to "n" servers:
       (1) having the client request a first secure connection to the proxy;
       (2) upon authenticating validity of a certificate received from the proxy, having the client request a second secure connection to the proxy, the second secure connection requesting the proxy to act as a conduit to the server;
       (3) having the client and the server negotiate a respective session master secret through the conduit;
       (4) upon completion of the negotiation, having the client deliver the respective session master secrets to the proxy using the first secure connection; and (b) having the proxy use the respective session master secrets to generate given cryptographic information that is useful for participating in the secure communication.

11. The method as described in claim 10 further including the step of having the proxy perform a given service on behalf of the client.

12. The method as described in claim 11 wherein the given service is selected from a set of services including transcoding, caching, encryption, decryption, monitoring, filtering and pre-fetching.

13. A method of enabling a proxy to participate in a secure communication, comprising the step of:

(a) transmitting a request from a client to the proxy to establish a first secure session;

(b) transmitting a request from the client to the proxy to establish a second secure session between the client and the proxy, the second secure session requesting the proxy to act as a conduit to an origin server;

(c) transmitting a session master secret from the client to the proxy using the first secure session to enable the proxy to participate in the secure communication;

(d) responsive to receipt at the client of a request from the proxy, repeating steps (a)–(b) to enable the proxy to act as a conduit to another origin server; and (e) transmitting a new session master secret from the client to the proxy.

14. The method as described in claim 13 wherein the new session master secret is transmitted over the first secure session.

15. A method of enabling a proxy to participate in a secure communication, comprising the step of:
   (a) receiving at the proxy a request from a client to establish a first secure session between the client and the proxy;
   (b) receiving at the proxy a request from the client to establish a second secure session between the client and the proxy, the second secure session requesting the proxy to act as a conduit to an origin server;
   (c) receiving at the proxy a session master secret transmitted from the client using the first secure session;
   (d) upon transmitting a given request from the proxy to the client, repeating steps (a)–(c) to enable the proxy to act as a conduit to another origin server; and
   (e) receiving at the proxy a new session master secret transmitted from the client.

16. The method as described in claim 15 further including the step of having the proxy use the session master secret and the new session master secret to generate given cryptographic information.

17. A method for enabling a proxy to participate in a session between a client and a first origin server, comprising the steps of:
   through the proxy, conducting a security handshake procedure between the client and the first origin server to produce a first session key;
   having the client transmit the first session key to the proxy so that the proxy can participate in communications between the client and the first origin server during the session; and
   as the session proceeds, conducting a security handshake procedure between the client and a second origin server to produce a second session key; and
   having the client transmit the second session key to the proxy so that the proxy can obtain data from the second origin server for use in servicing a request by the client to the first origin server.

18. The method as described in claim 17 wherein each session key is transmitted from the client to the proxy over a different secure connection.

19. The method as described in claim 17 wherein each session key is transmitted from the client to the proxy over the same secure connection.

20. A cryptographic system, comprising:
   a client;
   a set of servers;
   a proxy;
   a network protocol service for enabling the client and each server to communicate over a secure connection;
   a computer program (i) for controlling the client to request a first secure connection to the proxy, (ii) responsive to authenticating validity of a certificate from the proxy, for controlling the client to request a second secure connection to the proxy, the second secure connection requesting the proxy to act as a conduit to a given server, (iii) for controlling the client to negotiate with the given server through the conduit to obtain a session master secret; and (iv) upon successful completion of the negotiation, for controlling the client to deliver the session master secret to the proxy using the first secure connection; and
   a computer program (i) for controlling the proxy to use the session master secret to generate given cryptographic information, (ii) for controlling the proxy to request that the client selectively establish a separate secure connection with another server, and (iii) for switching the proxy into an active operating state during which it can participate in communications between the client and the given server.

21. The cryptographic system as described in claim 20 wherein the proxy includes means for providing transcoding services on behalf of the client.

22. The cryptographic system as described in claim 20 wherein the proxy includes means for providing encryption/decryption services on behalf of the client.

23. The cryptographic system as described in claim 20 wherein the proxy includes means for providing caching services on behalf of the client.

24. The cryptographic system as described in claim 20 wherein the proxy includes means for providing monitoring services on behalf of the client.

25. A computer program product in a computer readable medium for use in a cryptographic system including a client, a set of servers, and a proxy, comprising:
   a first routine (i) for controlling the client to request a first secure connection to the proxy, (ii) responsive to authenticating validity of a certificate from the proxy, for controlling the client to request a second secure connection to proxy, the second secure connection requesting the proxy to act as a conduit to a given server, (iii) for controlling the client to negotiate with the given server through the conduit to obtain a session master; and (iv) upon successful completion of the negotiation, for controlling the client to deliver the session master secret to the proxy using the first secure connection; and
   a second routine (i) for controlling the proxy to use the session master secret to generate given cryptographic information, (ii) for controlling the proxy to request that the client selectively establish a separate secure connection with another server, and (iii) for switching the proxy into an active operating state during which it can participate in communications between the client and the given server.

26. A computer program product having computer readable program code on a usable medium for use in a client for enabling a proxy to participate in a secure communication, comprising:
   means for transmitting a request from the client to the proxy to establish a first secure session;
   means for transmitting a request from the client to the proxy to establish a second secure session between the client and the proxy, the second secure session requesting the proxy to act as a conduit to an origin server;
   means for transmitting a session master secret from the client to the proxy using the first secure session to enable the proxy to participate in the secure communication;
   means responsive to receipt at the client of a given request from the proxy during the secure communication for controlling the client to obtain a new session master secret; and
   means for transmitting the new session master secret from the client to the proxy.

27. A computer program product having computer readable program code on a usable medium for use in a proxy for enabling the proxy to participate in a secure communication, comprising:

means for receiving at the proxy a request from a client to establish a first secure session between the client and the proxy;

means for receiving at the proxy a request from the client to establish a second secure session between the client and the proxy, the second secure session requesting the proxy to act as a conduit to an origin server;

means for receiving at the proxy a session master secret transmitted from the client using the first secure session;

means responsive to a given occurrence during the secure communication for transmitting from the proxy to the client a given request; and means for receiving at the proxy a new session master secret transmitted from the client.

28. The computer program product as described in claim 27 further including means for using the session master secret and the new session secret to generate given cryptographic information.

* * * * *